United States Patent [19]

Kubota et al.

[11] Patent Number: 5,721,738

[45] Date of Patent: Feb. 24, 1998

[54] DATA TRANSMISSION METHOD, SYSTEM, AND APPARATUS

[75] Inventors: Tatsuya Kubota; Youichi Matsumura; Hiroaki Seto; Norio Wakatsuki, all of Kanagawa, Japan

[73] Assignee: Sony Corporation, Tokyo, Japan

[21] Appl. No.: 703,033

[22] Filed: Aug. 26, 1996

[30] Foreign Application Priority Data

Aug. 28, 1995 [JP] Japan ................... 7-219287

[51] Int. Cl.⁶ ........................................ H04L 7/00
[52] U.S. Cl. ............................. 370/508; 370/519
[58] Field of Search ............................. 370/503, 507, 370/508, 509, 516, 517, 518, 519, 389, 395; 375/354, 359, 362, 371, 373, 376

[56] References Cited

U.S. PATENT DOCUMENTS

| | | | |
|---|---|---|---|
| 4,807,259 | 2/1989 | Yamanaka et al. | 370/507 |
| 4,860,285 | 8/1989 | Miller et al. | 370/507 |
| 5,025,457 | 6/1991 | Ahmed | 370/507 |
| 5,313,462 | 5/1994 | Fujino et al. | 370/507 |
| 5,487,070 | 1/1996 | Furukawa | 370/507 |
| 5,517,521 | 5/1996 | Strawn | 370/507 |

*Primary Examiner*—Douglas W. Olms
*Assistant Examiner*—Ricky Q. Ngo
*Attorney, Agent, or Firm*—Jay H. Maioli

[57] ABSTRACT

A data transmission method for transferring predetermined transmission data between a slave side and a master side to which the predetermined transmission data is transmitted and which are connected through a predetermined communications network, wherein the master side generates an independent synchronization clock signal and transmits synchronization data showing the frequency of the independent synchronization clock signal to the slave side, the slave side generates a slaved synchronization clock signal synchronized with the synchronization clock signal of the master side based on the synchronization data transmitted from the master side and generates the transmission data and transmits it to the master side in synchronization with the generated slaved synchronization clock signal, and the master side receives the transmission data transmitted from the slave side in synchronization with the independent synchronization clock signal.

27 Claims, 11 Drawing Sheets

FIG. 2

| BYTES | | | | | | | | | | |
|---|---|---|---|---|---|---|---|---|---|---|
| 3 | TRS (FFh,00h,00h) | | LSB | | | | | | | MSB |
| 13 { 1 | RTS1 | | b0 | b1 | b2 | b3 | b4 | b5 | V | V̄ |
| 1 | RTS2 | | b0 | b1 | b2 | b3 | b4 | b5 | V | V̄ |
| 1 | LNID1 | | FN | | | LN(1~31) | | | | |
| 2 | LN1 | | b0 | b1 | b2 | b3 | b4 | b̄4 | | |
| | | | b5 | b6 | b7 | b8 | b9 | b̄9 | | |
| 1 | LNID2 | | FN | | | LN(1~31) | | | | |
| 2 | LN2 | | b0 | b1 | b2 | b3 | b4 | b̄4 | | |
| | | | b5 | b6 | b7 | b8 | b9 | b̄9 | | |
| 1 | FLAG | | PT | | | | Sb0 | Sb1 | Sb2 | Sb3 |
| 1 | RS422-ch1 | | b0 | b1 | b2 | b3 | UL | ŪL | V | |
| 1 | RS422-ch2 | | b0 | b1 | b2 | b3 | UL | ŪL | V | |
| 1 | VOICE | | b0 | b1 | b2 | b3 | UL | ŪL | 8F1 | 8F2 |
| 1 | SPARE | | b0 | b1 | b2 | b3 | UL | ŪL | V | |
| 2 | CRCC1 | | b0 | b1 | b2 | b3 | b4 | b5 | b6 | b̄6 |
| | | | b7 | b8 | b9 | b10 | b11 | b12 | b13 | b̄13 |
| | ANC (a) | LOWER BYTE | | | | | | | | |
| | | UPPER BYTE | | | | | | | | |
| 2 | CRCC2 | | b0 | b1 | b2 | b3 | b4 | b5 | b6 | b̄6 |
| | | | b7 | b8 | b9 | b10 | b11 | b12 | b13 | b̄13 |
| | VIDEO (b) | LOWER BYTE | | | | | | | | |
| | | UPPER BYTE | | | | | | | | |
| 2 | CRCC3 | | b0 | b1 | b2 | b3 | b4 | b5 | b6 | b̄6 |
| | | | b7 | b8 | b9 | b10 | b11 | b12 | b13 | b̄13 |

|← 8 BITS →|

DATA TRANSMISSION METHOD, SYSTEM, AND APPARATUS

BACKGROUND OF THE INVENTION

1. Field of the Invention

The present invention relates to a data transmission method, system, and apparatus for transmitting audio, video, and other data through an asynchronous transmission mode (ATM) communications channel etc.

2. Description of the Related Art

Much use is being made of the MPEG2 system for compressing and encoding audio and video data. On the other hand, recently, the ATM system is being commercialized as a high speed digital data transmission system.

When transmitting audio and video data between two nodes, such as television broadcasting stations, connected through an ATM communications channel, it is necessary to establish synchronization between the two nodes. As one method for obtaining synchronization between two nodes through an ATM communications channel, there is known the method of using the residual time stamp (RTS) showing the whole number ratio of the frequency of the synchronization clock signal of the node on the transmitting side and the frequency of the network clock signal supplied from the ATM communications channel to the transmitting side node.

However, there is no synchronous relationship between the synchronization clock signal generated independently of other synchronization systems by a television broadcasting station on the master side (hereinafter a synchronization clock signal independent of other synchronization systems in a television broadcasting station etc. is referred to as a "house clock signal") and the network clock signal and therefore the synchronization data itself showing the ratio between them changes with each moment in time.

For example, when generating a synchronization clock signal of a broadcasting station at the side slaved (slave side) to the house clock signal of the broadcasting station on the side (master side) generating a synchronization clock signal independently using a phase locked loop (PLL) circuit based on the synchronization data transmitted from the master side, while the frequency of the synchronization clock signal generated will match the house clock signal of the master side, jitter will occur along with the change of the synchronization data. If a synchronization clock signal in which jitter has occurred is used for reproduction and transmission of audio and video data at the slave side, there is the possibility that the quality of the audio and video data transmitted will end up declining.

Below, an explanation will be made of the changes appearing in the synchronization data taking as an example the case of establishing synchronization for a synchronization clock signal ($4f_{sc}$) of 14.3181818143 MHz for composite video signal use in two broadcasting stations connected through an AAL1 protocol (155.2 Mbps) ATM communications channel.

A network clock signal (NCLK) of 19.44 MHz (=155.2 MHz/8) is supplied from the AAL1 protocol ATM communications channel to the broadcasting station. The ratio of the frequency of the network clock signal NCLK and the frequency of the synchronization clock signal $4f_{sc}$ (NCLK:$4f_{sc}$) is 1188:874.9999995 and cannot be expressed accurately by a whole number ratio. Therefore, if the master side counts the number of cycles of the housing clock signal $4f_{sc}$ occurring during 1188 cycles worth of the network clock signal NCLK and generates synchronization data accordingly, the value of the synchronization data would have to be other than a whole number, so sometimes changes from 875 to 874. Each time the value of the synchronization data changes from 875 to 874, the phase of the clock signal of the slave side changes.

More specifically, the probability Y of the value of the synchronization data changing becomes, when solving (875×(y−1)+874)/y−874.9999995, y=2000000. 1/2000000 is extremely small and does not in all practicality pose a problem when establishing synchronization between the master side and slave side. However, jitter ends up occurring in the synchronization clock signal $4f_{sc}$ on the slave side—there is no change in this. Further, the network clock signal NCLK is not always accurately 19.44 MHz, so this jitter cannot be ignored—particularly in fields requiring transmission of a high quality of audio and video data such as transmission of audio and video data between broadcasting stations.

SUMMARY OF THE INVENTION

The present invention was made in consideration of the above problems of the related art and has as its object the provision of a data transmission method, system, and apparatus which can transmit high quality audio and video data between two nodes connected through a communications network supplying a network clock signal such as an ATM communications channel.

The present invention has as another object the provision of a data transmission method, system, and apparatus which can receive at a master side without any effect of jitter, in synchronization with a synchronization clock signal (house clock signal) generated independently at the master side, video and audio data generated in synchronization with a synchronization clock signal generated at a slave side node using synchronization data and the network clock signal of the communications channel and transmitted through the communications channel to the master side.

According to a first aspect of the invention, there is provided a data transmission method for transferring predetermined transmission data between a slave side and a master side to which the predetermined transmission data is transmitted and which are connected through a predetermined communications network, wherein the master side generates an independent synchronization clock signal and transmits synchronization data showing the frequency of the independent synchronization clock signal to the slave side, the slave side generates a slaved synchronization clock signal synchronized with the synchronization clock signal of the master side based on the synchronization data transmitted from the master side and generates the transmission data and transmits it to the master side in synchronization with the generated slaved synchronization clock signal, and the master side receives the transmission data transmitted from the slave side in synchronization with the independent synchronization clock signal.

According to a second aspect of the invention, there is provided a data transmission method for transferring predetermined transmission data between a slave side and master side to which a predetermined network clock signal is supplied, to which the predetermined transmission data is transmitted in synchronization with the network clock signal, and which are connected through a predetermined communications network, wherein the master side generates an independent synchronization clock signal independent of the network clock signal and transmits synchronization data showing the ratio of the frequency of the network clock signal and the frequency of the independent synchronization clock signal by approximate whole numbers to the slave side, the slave side generates a slaved synchronization clock signal synchronized with the synchronization clock signal of the master side based on the synchronization data transmitted from the master side and generates the transmission data and transmits it to the master side in synchronization with the generated slaved synchronization clock signal, and the master side receives the transmission data transmitted from the slave side in synchronization with the independent synchronization clock signal.

According to a third aspect of the invention, there is provided a data transmission method for transferring transmission data between a master side and a slave side which are connected through a predetermined communications network so as to record data output from a recording and reproduction apparatus of the slave side in a recording and reproduction apparatus of the master side, wherein a delay time of the predetermined communications network is measured, the master side generates a synchronization clock signal and transmits synchronization data for shifting the phase of the synchronization clock signal by exactly the delay time along with other predetermined data as the transmission data to the slave side, the slave side reproduces data from the recording and reproduction apparatus of the slave side in synchronization with the synchronization data transmitted from the master side and transmits it as the transmission data to the master side, and the master side receives the transmission data transmitted from the slave side in synchronization with the synchronization clock signal and records it in the recording and reproducing apparatus of the master side.

According to a fourth aspect of the invention, there is provided a data transmission method for transferring transmission data between a master side and a slave side which are connected through a predetermined communications network so as to record data output from a recording and reproduction apparatus of the slave side in a recording and reproduction apparatus of the master side, wherein a delay time of the predetermined communications network is measured, the master side generates an independent synchronization clock signal and transmits synchronization data for shifting the phase of the independent synchronization clock signal by exactly the delay time as the transmission data to the slave side, the slave side generates a slaved synchronization clock signal synchronized with the independent synchronization clock signal of the master side based on the synchronization data transmitted from the master side, reproduces reproduction data from the recording and reproduction apparatus of the slave side in synchronization with the slaved synchronization clock signal generated, and transmits it as the transmission data to the master side, and the master side receives the transmission data transmitted from the slave side in synchronization with the independent synchronization clock signal and records it in the recording and reproducing apparatus of the master side.

According to a fifth aspect of the invention, there is provided a data transmission system for transferring transmission data between a master apparatus and a slave apparatus to which transmission data is transmitted and which are connected through a predetermined communications network, wherein the master apparatus has an independent synchronization clock signal generating means for generating an independent synchronization clock signal, a synchronization data generating means for generating synchronization data showing the frequency of the generated independent synchronization clock signal, a master side transmitting means for transmitting at least the generated synchronization data through the communications network to the slave apparatus, and a master side receiving means for receiving the transmission data transmitted from the slave apparatus through the communications network in synchronization with the generated independent synchronization clock signal and the slave apparatus has a slave side receiving means for receiving at least the synchronization data transmitted through the communications network from the master apparatus, a slaved synchronization clock signal generating means for generating a slaved synchronization clock signal in synchronization with the independent synchronization clock signal of the master apparatus based on the received synchronization data, a data generating means for generating the transmission data in synchronization with the generated slaved synchronization clock signal, and a slave side transmitting means for transmitting at least the generated predetermined transmission data through the communications network to the master apparatus.

According to a sixth aspect of the invention, there is provided a data transmission system for transmitting transmission data between a master apparatus and a slave apparatus connected through a predetermined communications network supplying a predetermined network clock signal to the connected transmission apparatuses and transmitting the transmission data in synchronization with the network clock signal, wherein the master apparatus has an independent synchronization clock signal generating means for generating an independent synchronization clock signal independent of the network clock signal, a synchronization data generating means for generating synchronization data showing the whole number ratio between the frequency of the independent synchronization clock signal and the frequency of the network clock signal, a master side transmitting means for transmitting at least the generated synchronization data through the communications network to the slave apparatus, and a master side receiving means for receiving the transmission data transmitted through the communications network from the slave apparatus in synchronization with the generated independent synchronization clock signal and the slave apparatus has a slave side receiving means for receiving at least the synchronization data transmitted through the communications network from the master apparatus, a slaved synchronization clock signal generating means for generating a slaved synchronization clock signal synchronized with the independent synchronization clock signal of the master apparatus based on the received synchronization data, a data generating means for generating the transmission data in synchronization with the generated slaved synchronization clock signal, and a slave side transmitting means for transmitting at least the generated predetermined transmission data through the communications network to the master apparatus.

According to a seventh aspect of the invention, there is provided a data transmission apparatus for transferring transmission data between transmission apparatuses which are connected through a predetermined communications network, having an independent synchronization clock signal generating means for generating an independent synchronization clock signal, a synchronization data generating means supplied with the independent synchronization clock signal and generating synchronization data showing the frequency of the independent synchronization clock signal, a transmitting means receiving as input at least the synchronization data from the synchronization data generating means and transmitting the synchronization data to the communications network, a receiving means for receiving transmission data transmitted through the communications network and including at least the synchronization data, a slaved synchronization clock signal generating means for generating from the synchronization data output from the receiving means a slaved synchronization clock signal synchronized with the independent synchronization clock signal, and a switching means for selecting the independent synchronization clock signal output from the independent synchronization clock signal generating means and outputting the independent synchronization clock signal to the transmitting means, the synchronization data generating means, the receiving means, and the slaved synchronization clock signal generating means when the data transmission apparatus operates as a master apparatus with respect to another data transmission apparatus connected through the communications network and for selecting the slaved synchronization clock signal output from the slaved synchronization clock signal generating means and outputting the independent synchronization clock signal to the receiving means, the transmitting means, and the synchronization data generating means when the data transmission apparatus operates as a slave apparatus with respect to another data transmission apparatus connected through the communications network.

According to an eighth aspect of the invention, there is provided a data transmission apparatus to which a network clock signal is supplied for transferring transmission data in synchronization with the network clock signal through a predetermined communications network, having an independent synchronization clock signal generating means for generating an independent synchronization clock signal independent from the network clock signal, a synchronization data generating means for generating synchronization data showing by a whole number ratio the ratio of the frequency of the independent synchronization clock signal generated from the independent synchronization clock signal output from the independent synchronization clock signal generating means and the frequency of the network clock signal, a transmitting means for transmitting at least the synchronization data generated by the synchronization data generating means to the communications network, a receiving means for receiving at least the transmission data transmitted through the communications network and including the synchronization data, a slaved synchronization clock signal generating means for generating a slaved synchronization clock signal synchronized with the independent synchronization clock signal from the synchronization data output from the receiving means, and a switching means for selecting the independent synchronization clock signal output from the independent synchronization clock signal generating means and outputting the independent synchronization clock signal to the transmitting means, the synchronization data generating means, the receiving means, and the slaved synchronization clock signal generating means when the data transmission apparatus operates as a master apparatus with respect to another data transmission apparatus connected through the communications network and for selecting the slaved synchronization clock signal output from the slaved synchronization clock signal generating means and outputting the independent synchronization clock signal to the receiving means, the transmitting means, and the synchronization data generating means when the data transmission apparatus operates as a slave apparatus with respect to another data transmission apparatus connected through the communications network.

BRIEF DESCRIPTION OF THE DRAWINGS

These and other objects and features of the present invention will become clearer from the following description of the preferred embodiments given with reference to the attached drawings, in which:

FIG. 2 is a view of the configuration of a transmission packet (PDU packet) by which the data transmission apparatuses shown in FIG. 1 transmit with each other via an ATM communications channel;

DETAILED DESCRIPTION OF THE PREFERRED EMBODIMENTS

First Embodiment

Below, an explanation will be made of a first embodiment of the present invention.

Figure 1:
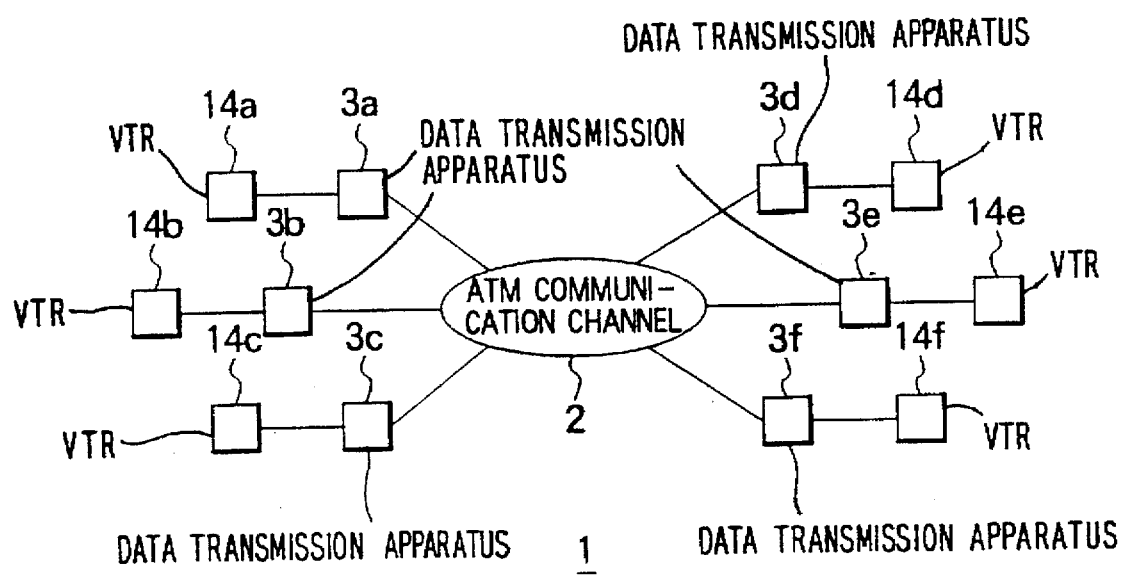
FIG. 1 is a view of the configuration of a data transmission system according to a first embodiment of the present invention.

FIG. 1 is a view of the configuration of a data transmission system i according to the present invention.

As shown in FIG. 1, the data transmission system 1 is comprised by data transmission apparatuses 3a to 3f to which video tape recorders (VTR) 14a to 14f are connected and which are connected with each other through an ATM communications channel 2 providing an AAL1 protocol transmission channel.

The data transmission apparatuses 3a to 3f transmit with each other the predetermined transmission data, for example, audio and video data for programs or coverage, through the ATM communications channel 2.

Note that the frequency of the network clock signal NCLK supplied from the ATM communications channel 2 to the data transmission apparatuses 3a to 3f is 19.44 MHz (155.52/8). On the ocher hand, the synchronization clock signal $4f_{sc}$ used in the data transmission apparatuses 3a to 3f when transmitting by the SDI system is approximately 14.3 MHz. When these frequencies are accurate, the ratio of the frequencies of these clock signals (NCLK:$4f_{sc}$) becomes 1188:874.9999995 or if made a whole number ratio 1188:875 or 1188:874.

The VTR's 14a to 14f record and reproduce the D2 standard digital audio and video data in synchronization with the synchronization clock signal $4f_{sc}$ and output the results by an improvement of the SDI system, that is, the SDDI system (hereinafter referred to simply as the SDI system), by the 143 Mbps serial format to the data transmission apparatuses 3a to 3f.

FIG. 2 is a view of the configuration of the transmission packet which the data transmission apparatuses 3a to 3f shown in FIG. 1 transmit to each other through the ATM communications channel 2 (SSCU-PDU packet, hereinafter simply referred to as the "PDU packet"). Note that the figures attached to the left of the PDU packet show the byte length of the data, while the figures attached to the right of the PDU packet show the content of the corresponding data.

The PDU packet may be roughly divided into a header region, ancillary region (ANC), and video data region. The data TRS in the header region is comprised of three consecutive words FFh, 00h, and 00h in order from the front and shows the header position of the PDU packet. Note that in the data TRS, the ancillary data region, and the video data region, it is forbidden for the data included in the PDU packet to take the value of 00h or FFh except for the data inserted every other 5 bytes.

The data RTS1 and RTS2 (residual time stamp) carry the synchronization data RTS which takes a 60 bit value of the count of the synchronization clock signal $4f_{sc}$ in the period of 1188 cycles of the external clock signal NCLK minus 832. However, a transmission packet is transmitted in the time of 910 cycles of the synchronization clock signal $4f_{sc}$, so it is possible that two counts will appear while one transmission packet is being transmitted. This measure is taken in this case to ensure two regions of the data RTS1 and RTS2.

The data RTS1 and RTS2 are used for establishment of network synchronization in the data transmission apparatus 3 of the receiving side (hereinafter when one of the data transmission apparatuses 3a to 3f etc. is shown nonspecifically, referred to as the data transmission apparatus 3 etc.) Note that the sixth bits of the data RTS1 and RTS2 are validity bits V. The content of the validity bit v is for example the logical value "1" when the data is valid and the logical value "0" when it is invalid. Further, to avoid the value of the data becoming 00h or FFh, the logically inverted value of the validity bit V is added as the seventh bit.

The data LNID (line number ID) is used for identifying the audio and video data of the transmitting apparatus included in the ancillary data region and video data region in the same PDU packet. The 0th to second bits show the field number (FN) showing the field in which the audio and video data are included, while the third to seventh bits, which take the value 0 to 31, show the line number (LN) showing the line in which the audio and video data are included.

The data LN1 takes a value in the range of 1 to 525 and along with the data LNID1 is used for identifying the audio and video data in the range of two fields. The 0th and fourth bits of the first byte and the second byte of the data LN1 carry the 0th to fourth bit and the fifth to ninth bit of these values, while the fifth bits of these each carry the logically inverted value of the fourth bit for the same reason as the validity bits V of the data RTS1 and RTS2.

The data LNID2 and LN2 are used when the timing for the processing of the transmission data transmitted by the data transmission apparatus 3 of the receiving side is decided on, for example, when the received transmission data is to be used for a program broadcast in real time and the data transmission apparatus 3 on the transmitting side compensates for the transmission delay time caused in the transmission data (transmission packet) in the ATM communications channel 2 etc.

That is, the data LNID2 and LN2 show by how many lines the VTR 14 has reproduced the transmission data faster and if the data transmission apparatus 3 has transmitted the transmission data for compensation of the transmission delay time in the television broadcasting state etc. on the transmitting side for the audio and video data included in the same PDU packet d. Note that, regarding the detailed contents of the data LNID2 and LN2, they carry information showing the number of lines adding the preceding amounts using as a reference the above data LNID1 and LN1.

Note that by referring to the data LNID2 and LN2, it is possible for the data transmitting apparatus 3 on the receiving side to identify the sampling method of the audio and video data included in the ancillary data region and video data region. That is, the shuffling block (for every 23 lines etc.) of the portion of the data relating to the video in the audio and video data is determined from the data LNID2 and LN2 and deshuffling performed for every shuffling block.

The data FLAG carries in the 0th to third bits the packet table (PT) data showing the amount of the data of the ancillary data portion and the video data portion. The fourth to seventh bits carry the bits sb0 to sb3. The bits sb0 to sb3 are used for transmitting the system of the shuffling on the encoder side.

The data RS422-ch1 and RS422-ch2 are for example used for transmission of control data etc. using RS422 between computers (not shown) connected to the data transmission apparatuses 3 on the transmitting side and receiving side.

The 0th to third bits of the data RS422-ch1 and RS422-ch2 carry either the upper 4 bits or lower 4 bits of the data transmitted. The fourth bit carries the bit UL (upper/lower) which becomes "1" when the data carried in the 0th to third bits are the upper 4 bits and becomes "0" when the data are the lower 4 bits. For the same reason as the validity bits V of the data RTS1 and RTS2, the fifth bit carries the logically inverted value of the fourth bit.

Further, the sixth bit is a validity bit V showing if the data RS422-ch1 and RS422-ch2 are valid or not.

The data VOICE carries the audio data used for communication between the transmitting side and the receiving side. The audio data can be sampled at a sampling frequency substantially equal to the sampling frequency of the PCM encoding apparatus used for general telephone communications for example. Further, to facilitate entry into the PDU packet in terms of timing, 8 bits at a time are generated with every two cycles of the horizontal synchronization signal of the video signal (15 and 75 kHz). Accordingly, one series of audio data is transmitted over two PDU packets—one of which is generated with each cycle of the horizontal synchronization signal. Note that in the case shown in FIG. 2, the 0th to third bits of the data VOICE carry the upper 4 bits or lower 4 bits of the audio data.

Further, the fourth bit, in the same way as the data RS422-ch1 and RS422-ch2, carries a bit UL showing if the data of the 0th to third bit are the upper 4 bits or the lower four bits. The fifth bit carries the logically inverted value of the fourth bit for the same reason as the validity bits V of the data RTS1 and RTS2. Further, a validity bit V showing if the audio data is valid is added.

Further, the sixth and seventh bits are made the bits 8F1 and 8F2 (8F is abbreviation for 8 frame) used for measuring the delay time given to the PDU packet by the internal circuits of the data transmission apparatus 3 and the ATM communications channel 2. Note that the data at the data LNID2 and LN2 are calculated based on the delay time measured using these bits 8F1 and 8F2.

The spare data is a region left empty as a reserve in the case another application arises, but like with the data RTS1 and RTS2 a logically inverted value of the sixth bit is inserted at the seventh bit so that the value does not become either 00h or FFh.

The data CRCC1, CRCC2, and CRCC3 carry the error correction codes for the preceding data regions, Note that like with the data RTS1 and RTS2, a logically inverted value of the sixth bit is inserted at the seventh bit so that the value does not become either 00h or FFh.

The word length of the ancillary data portion is for example 69 words. The AES/EBU data with the converted word width is inserted there. For example, when converting 55 word AES/EBU data to 8 bits, the 8-bit parallel data obtained as a result of the conversion becomes 68 words and 6 bits.

In this case, to prevent the occurrence of a prohibit code (00h or FFh), the 2-bit value 01 or 10 is inserted. The inserted 01 or 10 is discarded when the PDU packet is reproduced at the data transmission apparatus 3 of the receiving side. Note that in this region, the AES/EBU data is arranged with the lower words in the front of the PDU packet and the higher words in the rear.

In the video data region, due to the word width of 1 word 10 bits complying with the SDI system, the data mainly relating to the image in the 1-word 8-bit video data complying with the ATM communications channel 2 is inserted in line units of the D2 standard video data. Note that the video data is arranged with the lower bytes in the front of the PDU packet and the higher bytes in the rear.

Note that the ancillary data region and the video data region of the PDU packet are variable in length. Sometimes these regions do not include valid data. Further, the data RS422-ch1, VOICE, etc. have the validity bit V, so when for example only the validity data of the data VOICE is "1" and the validity data V of the rest of the data are "0", it means that only the data VOICE is valid and the other data are all invalid.

Below, an explanation will be made of the relationship between the transmission data multiplexed at the ancillary data region and video data region of the PDU packet and the D2 standard audio and video data input to or output from the VTR 14.

Figure 3:
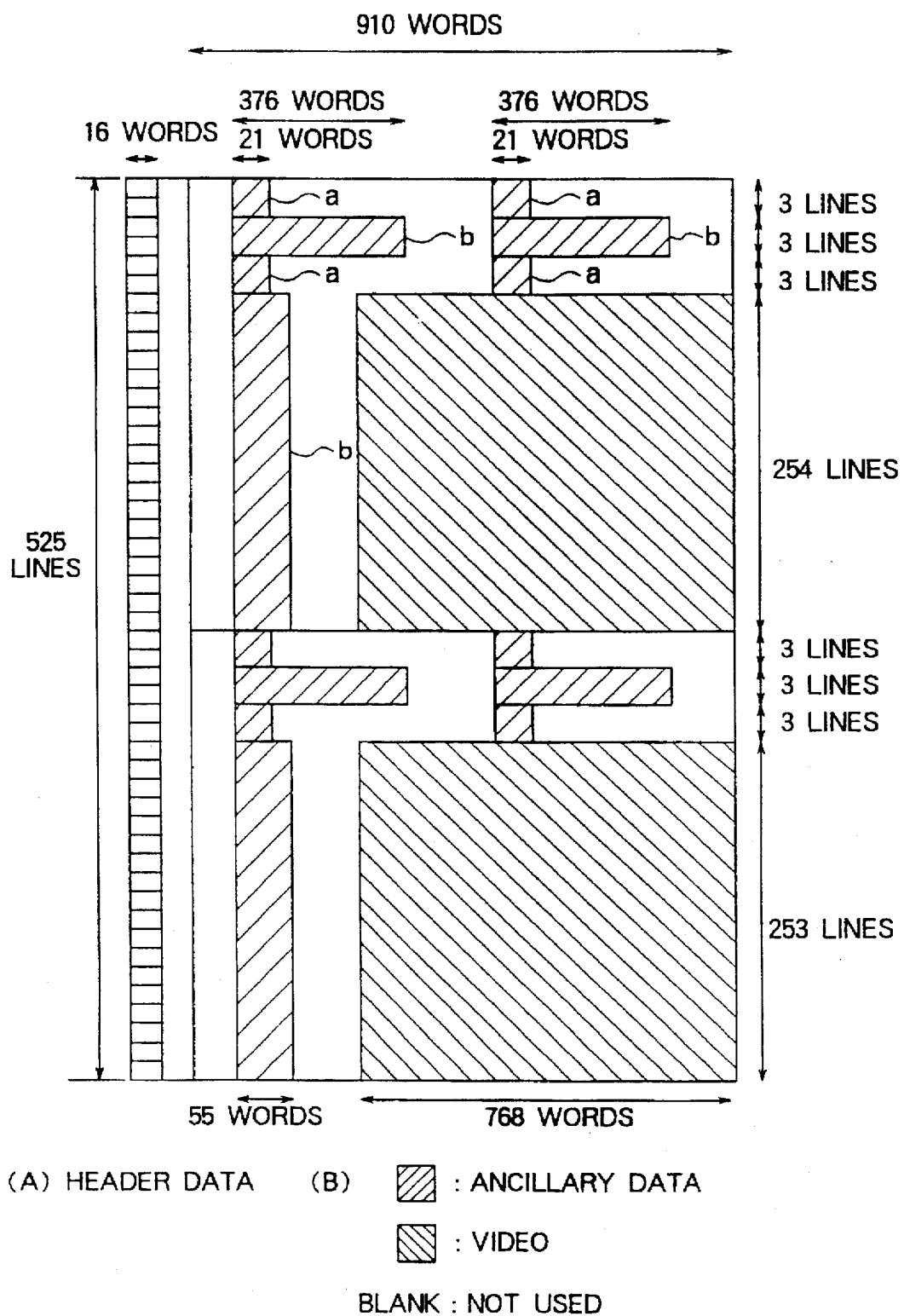
FIG. 3 is a view explaining the configuration of D2 standard audio and video data.

FIG. 3 is a view of the configuration of the D2 standard audio and video data.

The amount of data of the D2 standard header data corresponding to a 525 line-29.97 frame/second system is 16 words×8 bits for each horizontal synchronization time (line), so the data rate becomes 2 Mbps as shown by the following equation:

$$16 \times 8 \text{ bits} \times 525 \text{ lines} \times 29.97 \text{ frames} = 2 \text{ Mbps} \qquad (1)$$

Further, in a 525 line-29.97 frame/second system, there are 910 pixels included in one line and 10 bits of data per pixel, so the data rate becomes 143 Mbps as shown in the following equation:

$$910 \text{ pixels} \times 10 \text{ bits} \times 525 \text{ lines} \times 29.97 \text{ frames} = 143 \text{ Mbps} \qquad (2)$$

However, as shown in FIG. 3, the D2 standard audio and video data includes unnecessary portions. Only the ancillary portion (audio data), video data, and header data shown by the hatching in FIG. 3 are necessary for audio reproduction and video reproduction at the receiving side.

The data rates of the ancillary data, video data, and header data shown in FIG. 3 are shown by the following equations:

Amount a of data per second of ancillary data portion $$21 \times 10 \text{ bits} \times 12 \text{ lines} \times 29.97 \text{ frames} \times 2 = 0.15 \text{ Mbps} \qquad (3)$$

Amount b of data per second of ancillary data portion $$376 \times 10 \text{ bits} \times 6 \text{ lines} \times 29.97 \text{ frames} \times 2 = 1.3 \text{ Mbps} \qquad (4)$$

Amount c of data per second of ancillary data portion $$55 \times 10 \text{ bits} \times 254 \text{ lines} \times 29.97 \text{ frames} \times 2 = 8.4 \text{ Mbps} \qquad (5)$$

Amount d of data per second of video data portion $$768 \times 8 \text{ bits} \times (254+253) \text{ lines} \times 29.97 \text{ frames} = 93.3 \text{ Mbps} \qquad (6)$$

Total amount e of data per second of video data portion and ancillary data portion $$a+b+c+d=0.15+1.3+8.4+93.3=103.2 \text{ Mbps} \qquad (7)$$

Further, when the header data is added, the data rates of the ancillary data, video data, and header data become 105.2 Mbps as shown in the following equation:

$$2+103.2=105.2 \text{ Mbps} \qquad (8)$$

In this way, 105.2 Mbps worth of data in the D2 standard audio and video data (total 143 Mbps) after removing the unnecessary portion is multiplexed at the ancillary region and video data of the PDU packet. Since the unnecessary portion is removed, there is a margin of comfort in the transmission data and it becomes possible to transmit D2 standard audio and video data through the ATM communications channel.

Further, the audio and video data has periodicity as shown in FIG. 3, so both at the transmitting side and the receiving side can be multiplexed with a PDU packet by a certain processing method in line units. Accordingly, the configuration of the hardware becomes simple.

By transmitting the transmission data and the RTS data and other data multiplexed to the PDU packet as explained above, it is possible to not only simply transmit the transmission data, but also to transmit data advantageous to the processing of the transmission data at the receiving side.

Note that in addition to the first embodiment, the data transmission system i according to the present invention may have various other configurations such as a configuration of a greater or lower number of the data transmission apparatuses 3 or further increasing the types of data multiplexed in the PDU packet.

Second Embodiment

Below, a second embodiment of the present invention will be explained. In the second embodiment, the data transmission method according to She present invention shown in the first embodiment is simplified. It is a method for transmission where, for example, the portion of the data above 10.2 Mbps (=143–132.8 Mbps) is removed from the D2 standard audio and video data shown in FIG. 3 by a certain method and the result is transmitted as is using the transport packet shown in FIG. 4.

As explained above, the actual transmission data rate by the AAL1 protocol of the ATM communications channel 2 is 132.8 Mbps. Accordingly, it is possible to compress the 143 Mbps D2 standard audio and video data by a very low compression rate by the difference of these values. Further, by causing partial omission of the data, it is possible to transmit the D2 standard audio and video data (transmission data) through the ATM communications channel 2. Note that in the SMPTE-259M, the D2 format includes several predetermined words. These words do not necessarily have to be transmitted. Accordingly, elimination of such words may be considered as the method of partial omission of data.

Figure 4:
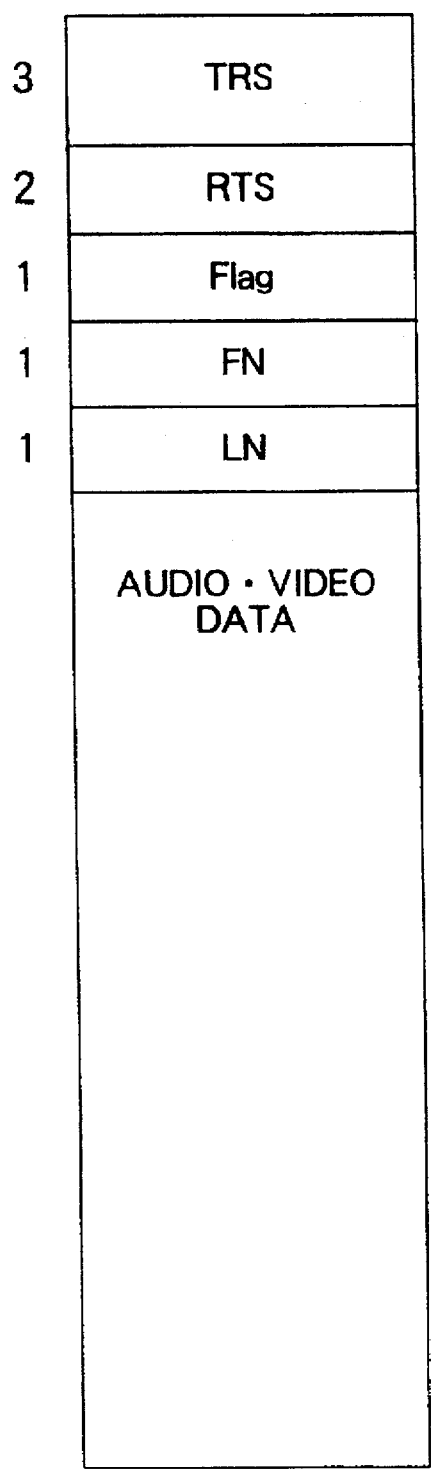
FIG. 4 is view of the configuration of a transport packet in a second embodiment.

The transport packet shown in FIG. 4 has multiplexed in it for each line the data TRS, RTS FLAG, FN, and LN and the D2 standard audio and video data. Note that the data TRS, RTS, FLAG, FN, and LN shown in FIG. 4 are the same as the corresponding data of the PDU packet shown in FIG. 2.

Compared with the amount of data of the audio and video data, the amount of data of the data TRS, RTS, FLAG, FN, and LN is negligible, so there is no effect on the thruput of the transmission even if these data are multiplexed as well.

By using the transport packet shown in FIG. 4, the processing relating to the transmission becomes simpler than the case shown in the first embodiment and the configuration of the hardware can be simplified as well.

Third Embodiment

Below, an explanation will be made of the configuration of the data transmission apparatuses 3a and 3b and a method of transmission of data between them as a third embodiment of the present invention. Note that in the third embodiment, the explanation is made only of the data transmission apparatuses 3a and 3b so as to simplify the explanation, but the configurations of the other data transmission apparatuses 3c to 3f and the method of transmitting data among these data transmission apparatuses 3c to 3f may also be the same.

Figure 5:
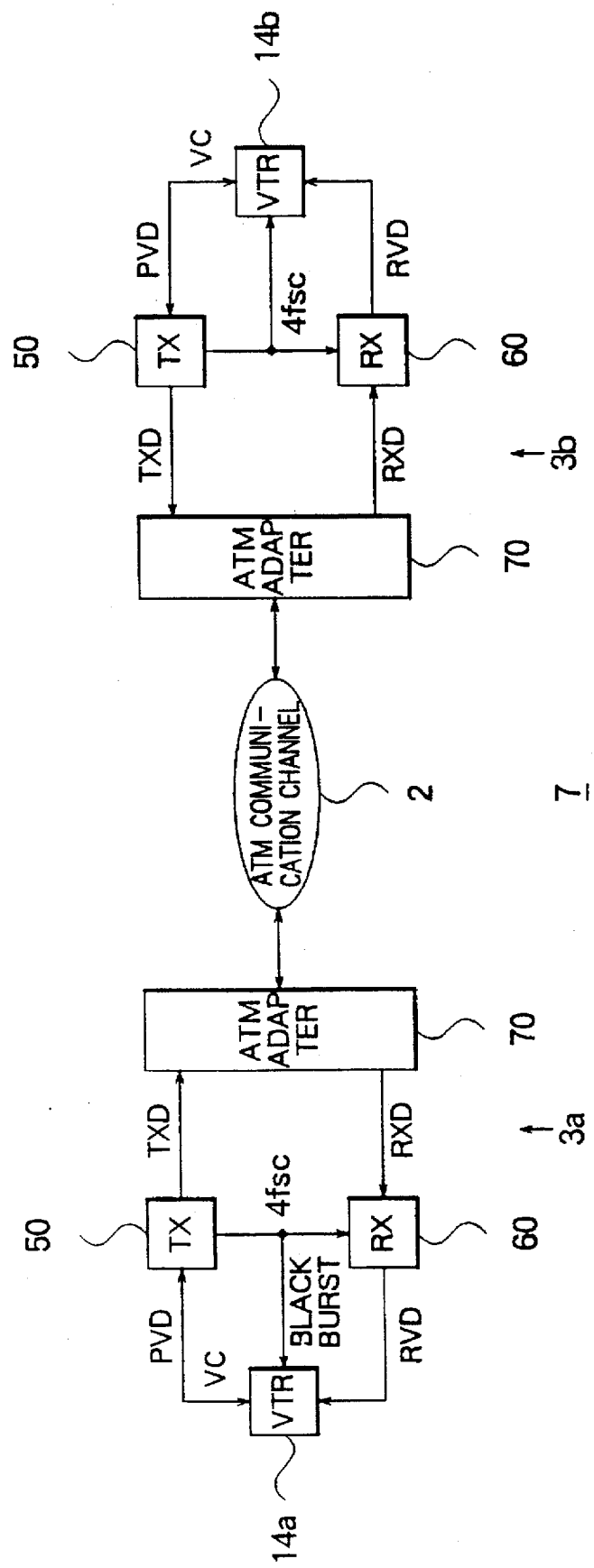
FIG. 5 is a view of the configuration of a data transmission apparatus according to a third embodiment of the present invention.

FIG. 5 shows the configuration of the data transmission apparatuses 3a and 3b shown in FIG. 1. The data transmission apparatus 3a operates as a master apparatus generating a synchronization clock signal independently, while the data transmission apparatus 3b operates as a slave apparatus slaved to the synchronization clock signal of the data transmission apparatus 3a.

As shown in FIG. 5, in the data transmission system 7, the data transmission apparatuses 3a and 3b are connected through an ATM communications channel 2 and are each comprised of an ATM adapter 70, transmitting unit (TX) 50, and receiving unit (RX) 60. Further, VTR's 14a and 14b are connected.

The ATM adapter 70 serves as the interface for the transmission and reception of data between the transmitting unit 50 and receiving unit 60 and the ATM communications channel 2.

The VTR'S 14a and 14b reproduce the D2 standard digital audio and video data, for example, from a video tape in accordance with control of the transmitting unit 50 through the control signal VC and output the same in synchronization with the synchronization clock signal $4f_{sc}$ generated by the receiving unit 60 or the house clock signal $4f_{sc}$ generated by the transmitting unit 50 (black burst signal) as the SDI system or SDDI system (hereinafter referred to simply as the SDI system) 143 Mbps serial format transmission data to the transmitting unit 50.

The D2 standard transmission data (received data) RVD received by the receiving unit 60 and demultiplexed from the PDU packet is input from the receiving unit 60 to the VTR's 14a and 14b in an SDI system 143 Mbps serial format. The VTR's 14a and 14b store the received data RVD.

Further, the bits 8F1 and 8F2 (FIG. 2) received by the receiving unit 60 are supplied from the receiving unit 60 to the transmitting unit 50.

The data transmission apparatus 3a operates as a master apparatus performing internal processing in synchronization with the synchronization clock signal (house clock signal) $4f_{sc}$ generated from the transmitting unit 50 independent of the network clock signal NCLK of the ATM communications channel 2.

In the data transmission apparatus 3a, the house clock signal $4f_{sc}$ is supplied from the transmitting unit 50 to the receiving unit 60 and the VTR 14a. The receiving unit 60 and the VTR 14a therefore operate in synchronization with the house clock signal $4 f_{sc}$.

The data transmission apparatus 3b operates as a slave apparatus operating in synchronization with the house clock signal $4f_{sc}$ of the data transmission apparatus 3a.

In the data transmission apparatus 3b, a synchronization clock signal $4f_{sc}$ generated by the receiving unit 60 using the synchronization data RTS (FIG. 2) transmitted through the ATM communications channel 2 to the data transmission apparatus 3a is supplied from the receiving unit 60 to the transmitting unit 50 and the VTR 14b. The transmitting unit 50 and the VTR 14b therefore operate in synchronization with the synchronization clock signal $4 \& f_{sc}$.

Note that actually the VTR 14b is supplied with an analog format black burst signal synchronized with the synchronization clock signal $4f_{sc}$ from the receiving unit 60 instead of the synchronization clock signal $4f_{sc}$ generated by the receiving unit 60.

Figure 6:
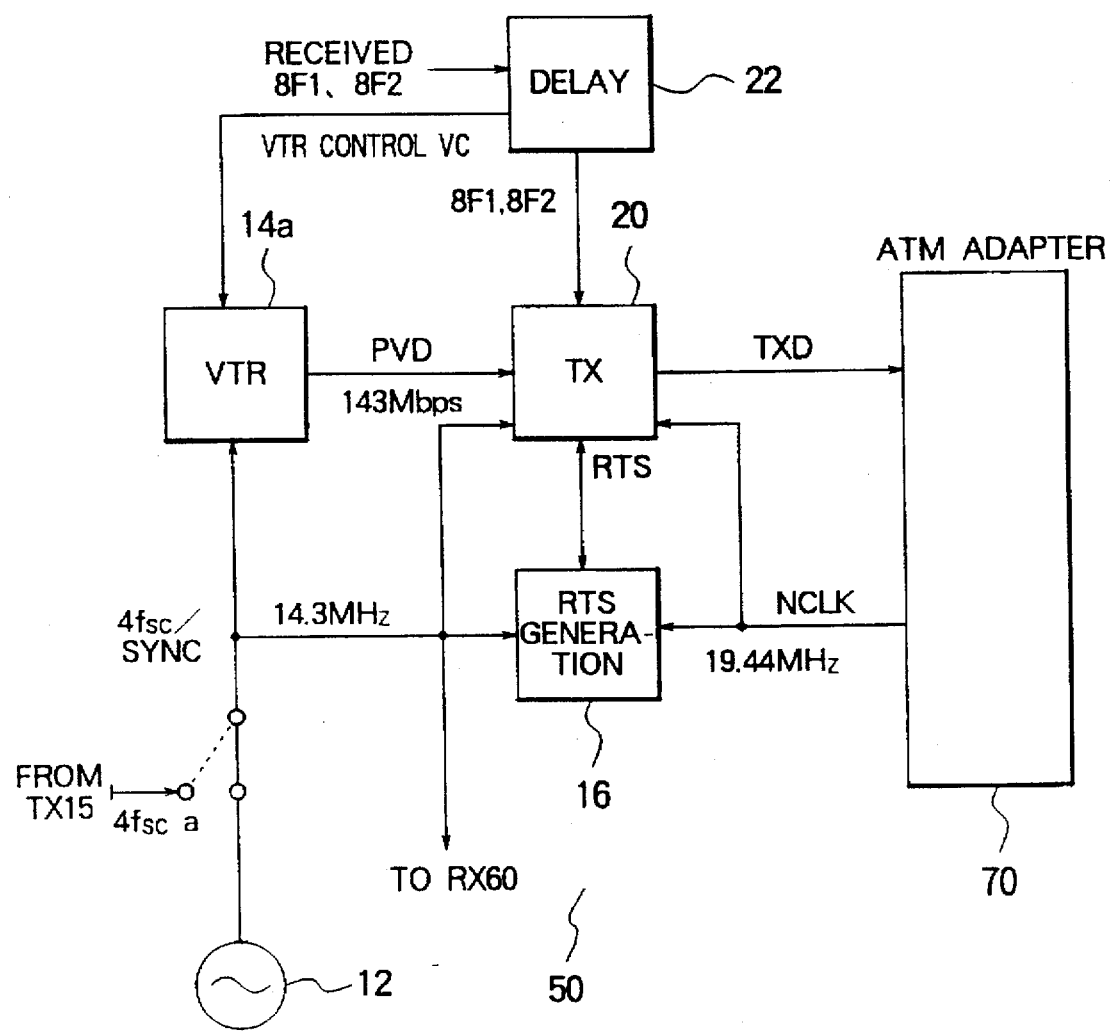
FIG. 6 is a view of the configuration of a transmitting unit shown in FIG. 5.

FIG. 6 shows the configuration of the transmitting unit 50 shown in FIG. 5.

As shown in FIG. 6, the transmitting unit 50 is comprised of a clock generating apparatus 12, an RTS generating apparatus 16, a transmitting unit (TX) 20, a delay processing circuit 22, and a switch 24.

The clock generating apparatus 12 generates with a high precision the house clock signal $4f_{sc}$ of 14.3181818143 MHz and a synchronization signal SYNC corresponding to the horizontal synchronization signal and vertical synchronization signal of the video signal.

The switch 24 selects the contact point a side and outputs the synchronization clock signal $4f_{sc}$ input from the receiving unit 60 to the transmitting apparatus 20 and the RTS generating apparatus 16. Due to this selection of the switch 24, the transmitting apparatus 20 of the slave apparatus operates in synchronization with the house clock signal $4f_{sc}$ of the master apparatus.

Further, in the data transmission apparatus 3a operating as the master apparatus, the switch 24 selects the contact point b side and outputs the house clock signal $4f_{sc}$ input from the clock generating apparatus 12 to the transmitting apparatus 20 and the RTS generating apparatus 16. Due to the selection of the switch 24, the transmitting apparatus 20 of the master apparatus operates in synchronization with the house clock signal $4f_{sc}$ of the master apparatus (hereinafter, in the transmitting unit 50, the clock signal selected by the switch 24 is referred to as the internal clock signal $4f_{sc}$), The RTS generating apparatus 16 generates the synchronization data TRS (residual time stamp) showing the whole number ratio of the frequency of the internal clock signal $4f_{sc}$ to the frequency of the network clock signal NCLK supplied from the ATM communications channel 2 used for the establishment of synchronization between the data transmission apparatuses 3a and 3b.

Figure 7:
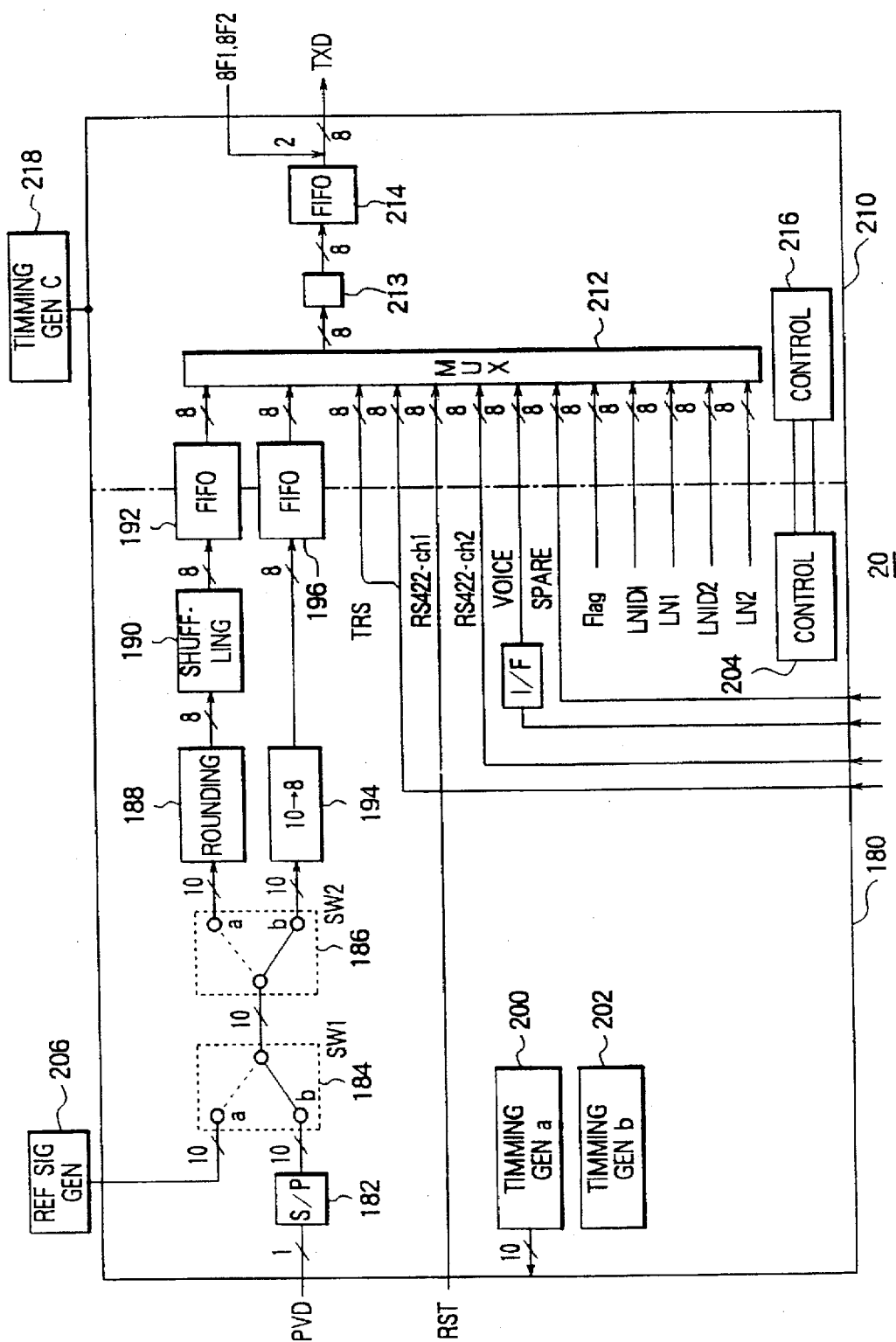
FIG. 7 is a view of the configuration of a transmitting apparatus shown in FIG. 6.

FIG. 7 is a view of the configuration of the transmitting apparatus shown in FIG. 6.

As shown in FIG. 7, the transmitting apparatus 20 is comprised of a first block 180 operating in synchronization with the internal clock signal $4f_{sc}$ selected by the switch 24 and a second block 210 operating in synchronization with the network clock signal NCLK.

The first block 180 is comprised of a serial/parallel conversion circuit (S/P circuit) 182, a first switch circuit (SW1) 184, a second switch circuit (SW2) 186, a rounding circuit 188, a shuffling circuit 190, a first FIFO circuit 192, a word width conversion circuit (10→8) 194, a second FIFO circuit 196, a timing generating circuit a200, a timing generating circuit b202, a control circuit 204, and a reference signal generating circuit 206.

The second block 210 is comprised of a multiplexing circuit (MUX) 212, a third FIFO circuit 214, a control circuit 216, and a timing generating circuit c218.

In the first block 180, the timing generating circuit a200 generates video data corresponding to a black burst (black burst data) at an operational timing based on the data RTS of the value in the case where data is not transmitted from the other data transmission apparatuses 3a to 3f (default).

The reference signal generating circuit 206 is a circuit outside of the first block 180, generates black burst data in the same way as the timing generating circuit a200, and outputs it to the terminal a of the switch circuit 184.

The S/P circuit 182 converts the 1-bit serial format SDI system transmission data input from the VTR 14 into a 10-bit parallel format and outputs it to the terminal b of the switch circuit 184.

The switch circuit 184 selects the terminal b side and outputs the output data of the S/P circuit 182 to the switch circuit 186 when the transmitting unit 50 is transmitting data and selects the terminal a side and outputs the black burst data output from the reference signal generating circuit 206 in other cases.

The switch circuit 186 selects the video data portion of the D2 standard audio and video data shown in FIG. 3 out of the output data (transmission data) of the S/P circuit 182 selected by the switch circuit 184 and outputs it to the rounding circuit 188 and selects the ancillary data portion and outputs it to the word width conversion circuit 194.

The rounding circuit 188 converts the data corresponding to the video data portion shown in FIG. 3 (video data) into 8-bit parallel format data (rounds it off) and outputs it to the shuffling circuit 190. Note that the header data shown in FIG. 3 is handled by the control circuit 204.

The shuffling circuit 190 rearranges the 8-bit parallel signal input from the rounding circuit 188 to an easily interpolated order when a data error occurs in the ATM communications channel 2 and outputs the result to the FIFO circuit 192.

The word width conversion circuit 194 converts the data corresponding to the ancillary data portion input from the switch circuit 186 shown in FIG. 3 (audio data) into an 8-bit parallel format and outputs the result to the FIFO circuit 196.

The FIFO circuits 192 and 194 read the data in synchronization with the internal clock signal $4f_{sc}$, successively output the data in synchronization with the network clock signal $4f_{sc}$, and transfer the data from the first block 180 to the second block 210.

The control circuits 204 and 216 monitor the addresses in which data is to be written and the addresses from which it is to be read in the FIFO circuits 192 and 19a and controls these addresses.

Further, the first block 180 generates the data LN1, LNID1, LN2, and LNID2, and the data FLAG (FIG. 2) based on the bits 8F1 and 8F2 etc. and outputs them to the second block 210.

In the second block 210, the timing generating circuit c218 controls the operational timing of the block 210 based on the network clock signal NCLK.

The multiplexing circuit 212 receives as input the data RTS from the RTS generating apparatus 16 and receives as input from the first block 180 the data LN1, LNID1, LN2, LNID2, and FLAG. The multiplexing circuit 212 multiplexes this data and the audio data and video data input from the FIFO circuits 192 and 194 and outputs the result to the FIFO circuit 214.

The CRCC adding circuit 213 calculates and adds the data CRCC and outputs it to the FIFO circuit 214.

The FIFO circuit 214 buffers the output data of the multiplexing circuit 212 and outputs the result as the transmission data TXD to the ATM communications channel 2. Note that as shown in the figure, the output data of the FIFO circuit 214 has further added to it the bits 8F1 and 8F2 from the delay processing circuit 22 to give the transmission data TXD.

Figure 8:
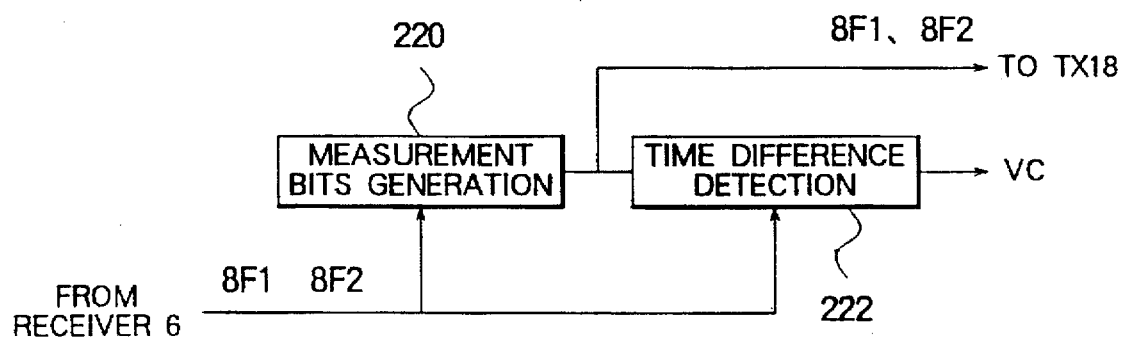
FIG. 8 is a view of the configuration of a delay processing circuit shown in FIG. 6.

FIG. 8 is a view of the configuration of the delay processing circuit 22 shown in FIG. 6.

As shown in FIG. 8, the delay processing circuit 22 is comprised of a measurement use bit generating circuit 220 and a time difference detecting circuit. The delay processing circuit 22 of the data transmission apparatus 3a operating as the master apparatus measures the transmission delay time received from the ATM communications channel 2 while the transmission data travels back and forth between the data transmission apparatuses 3a and 3b based on the bits 8F1 and 8F2 input from the receiving unit 60.

The measurement use bit generating circuit 220 generates the bit 8F2 shown in FIG. 2 and returns the bit 8F2 received by the receiving unit 60 to the bit 8F1.

The time difference detecting circuit 222, as shown in FIG. 6, detects the time difference between the bit 8F1 received by the receiving unit 60 and the bit 8F2 generated by the measurement use bit generating circuit 220, calculates the transmission delay time Td, controls the VTR 14 through the control signal VC, and performs advance control.

Figure 9:
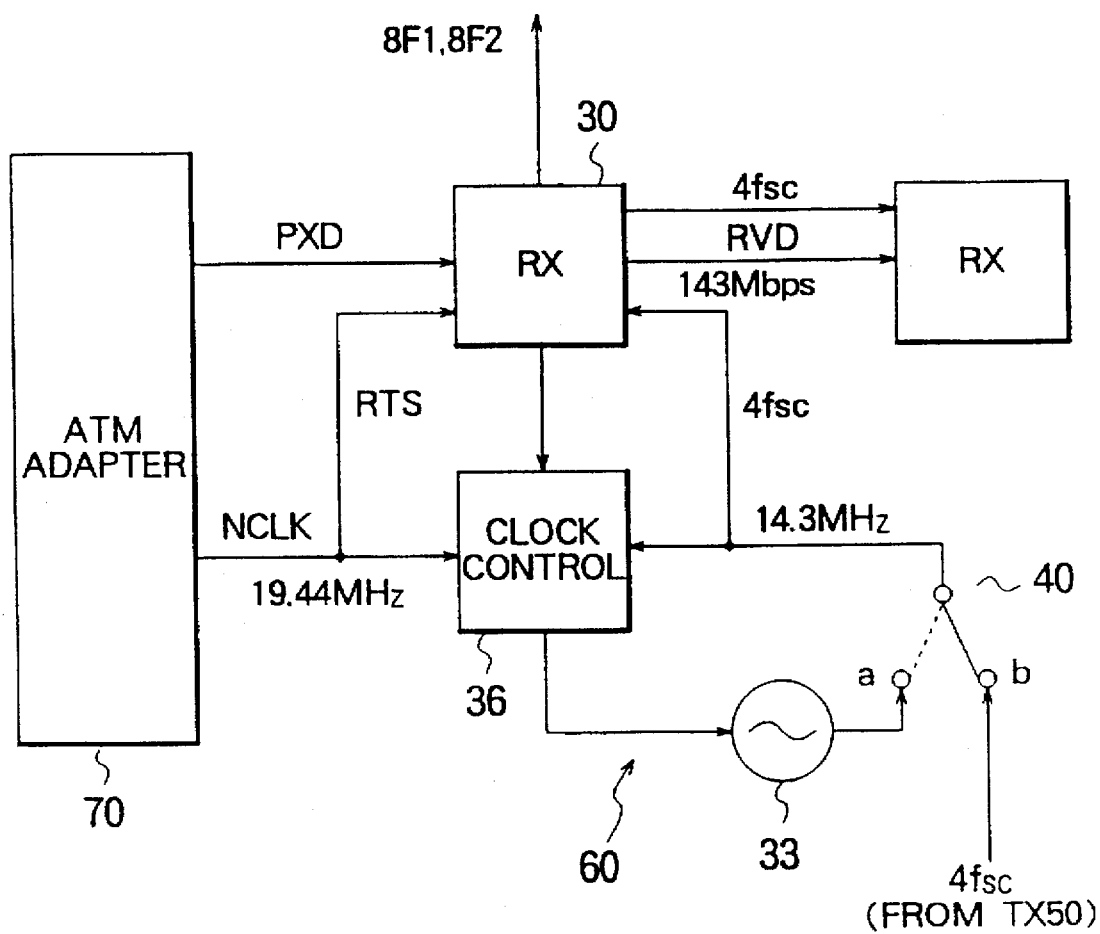
FIG. 9 is a view of the configuration of a receiving unit shown in FIG. 5.

FIG. 9 is a view of the configuration of the receiving unit 60 shown in FIG. 5.

As shown in FIG. 9, the receiving unit 60 is comprised of a receiving apparatus (RX) 60, a clock control apparatus 36, a clock generating apparatus 38, and a switch The receiving unit 60 of the data transmission apparatus 3b operating as the slave apparatus receives from these parts the PDU packet transmitted through the ATM communications channel 3 from the other side, reproduces a synchronization clock signal $4f_{sc}$ synchronized with the house clock signal $4f_{sc}$ of the data transmission apparatus 3a of the transmission side based on the synchronization data RTS and the network clock signal NCLK, separates the audio and video data (transmission data) from the PDU packet, and outputs the results.

The transmitting unit 60 of the data transmission apparatus 3a operating as the master apparatus generates a clock signal synchronized with the house clock signal $4f_{sc}$ input from the transmitting unit 50.

That is, in the receiving unit 60 of the data transmission apparatus 3b operating as the slave apparatus, the switch 40 selects the connection point a and outputs the synchronization clock signal $4f_{sc}$ synchronized with the house clock signal $4f_{sc}$ of the data transmission apparatus 3a from the clock generating apparatus 38 to the receiving apparatus 30 and the clock control apparatus 36. The selection of the switch 40 causes the receiving apparatus 30 to operate synchronized with the house clock signal $4f_{sc}$ of the data transmission apparatus 3a.

Further, in the receiving unit 60 of the data transmission apparatus 3a operating as the master apparatus, the switch 40 selects the connection point b and outputs the house clock signal $4f_{sc}$ input from the transmitting unit 50 to the receiving apparatus 30 and the clock control apparatus 36. The selection of the switch 40 causes the receiving apparatus 30 to operate synchronized with the house clock signal $4f_{sc}$ of the data transmission apparatus 3a (hereinafter the clock signal selected by the switch 40 and used inside the receiving unit 60 is referred to as the internal clock signal $4f_{sc}$).

The clock generating apparatus 88 is, for example, a voltage-controlled oscillation circuit having a quartz oscillation circuit, generates an internal clock signal $4f_{sc}$ of a frequency in accordance with the control of the clock control apparatus 36 through the clock control signal CC, and supplies the same to the parts of the receiving apparatus 30.

The clock control apparatus 36 generates the clock control signal CC based on the synchronization data RTS input from the receiving apparatus 30, controls the frequency of the internal clock signal $4f_{sc}$ generated by the clock generating apparatus 38 through the clock control signal CC, causes the internal clock signal $4f_{sc}$ of the receiving apparatus 30 to be synchronized with the house clock signal $4f_{sc}$ of the data transmission apparatus 3a, and further generates the synchronization signal SYNC corresponding to the horizontal synchronization signal and vertical synchronization signal.

That is, when the receiving unit 60 of the data transmission apparatus 3b operates as a slave side, the clock control signal CC is output from the clock control apparatus 38 Go the clock generating apparatus 38 so that the internal clock signal $4f_{sc}$ output from the clock generating apparatus 38 synchronizes with the RTS input to the clock control apparatus 36.

Accordingly, the synchronization clock signal $4f_{sc}$ from the clock generating apparatus 38 is output to the receiving apparatus 30 and the clock control apparatus 36 in synchronization with the house clock signal of the data transmission apparatus 3a. The receiving unit 60 of the data transmission apparatus 3b obtains a synchronization clock signal $4f_{sc}$ synchronized with the house clock signal of the data transmission apparatus 3a.

Figure 10:
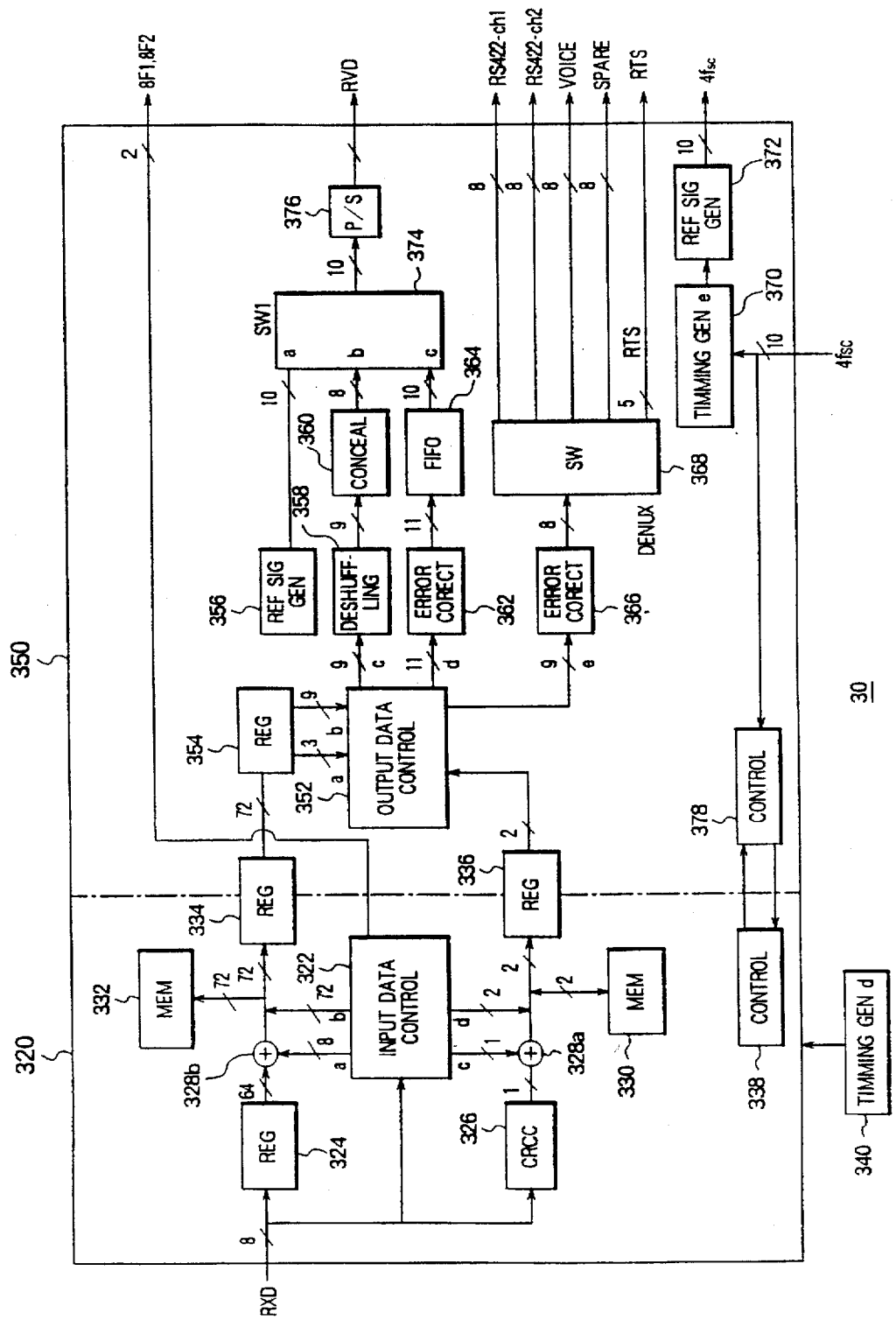
FIG. 10 is a view of the configuration of a receiving apparatus shown in FIG. 9.

FIG. 10 is a view of the configuration of the receiving apparatus 30 shown in FIG. 9.

As shown in FIG. 10, the receiving apparatus 30 is comprised of a first block 320 operating in synchronization with the network clock signal NCLK and a second block 350 operating in synchronization with the internal clock signal $4f_{sc}$. It separates the data and the transmission data from the PDU packet received as the received data RXD from the ATM communications channel 2, outputs out of the demultiplexed data the transmission data as the received data RVD to the VTR 14, and outputs the bits 8F1 and 8F2 to the delay processing circuit 22.

The first block 320 is comprised of an input data control circuit 322, first register 324, CRCC calculation circuit 326, addition circuits 328a and 328b, first memory circuit 330, second memory circuit 332, second register circuits 334, third register circuit 336, control circuit 338, and timing generating circuit d340.

The second block 350 is comprised of an output data control circuit 352, fourth register 354, first reference signal generating circuit 356, deshuffling circuit 358, conceal circuit 360, first error correction circuit 362, FIFO circuit 364, second error correction circuit 366, switch circuit 368, timing generating circuit e370, second reference signal generating circuit 372, switch circuit 374, parallel/serial conversion circuit (P/S circuit) 376, and control circuit 378.

The PDU packet which the receiving apparatus 30 receives from the ATM communications channel 2 is input to the input data control circuit 322, first register circuit 324, and CRCC calculation circuit 326.

The first register circuit 324 converts the received 8-bit parallel format PDU packet to a 64-bit parallel format.

The CRCC calculation circuit 326 performs processing for calculation relating to the data CRCC (FIG. 2) contained in the PDU packet and outputs the results of the calculation to the addition circuit 328a. Note that the CRCC calculation circuit 326 divides the transmission data $X^n+X^{n-1}+X^{n-2}+\ldots+X+1$ by $G(X)=X^{14}+X^2+X+1$ and when the remainder is other than 0 detects an error and makes the results of the calculation the logical value "1" and outputs the same.

The input data control circuit 322 generates the write flag data (a; 8-bit parallel data where all bits are the logical value "0") and each bit corresponds to 1 byte of the PDU packet) and outputs it to the addition circuit 328b. The addition circuit 328b adds the write flag data to the output data of the first register circuit 324, makes it a 72-bit width, and outputs the result.

Further, the input data control circuit 322 generates read flag data (b) of a 9 bit×8 word configuration. The input data control circuit 322 reads the read flag data, then makes only the parity bit the logical value "1" and makes the other bits all the logical value "0" and writes them in the memory circuit 332 having an address space of the number of lines (525)×packet length of the PDU packet×9 bits.

The reason why the input data control circuit 322 performs the bit operation on the read flag data is to decide if the required data has not arrived when the read flag data of the read data is the logical value "1". Note that if writing before reading, the read flag data becomes the logical value "0".

The register circuit 334 reads out together eight series of the 8-bit data, comprised of 8 bits of received data and 1 bit of the flag data corresponding to the received data, as the 72-bit data in synchronization with the network clock signal NCLK from the memory circuit 332, then outputs it in synchronization with the internal clock signal $4f_{sc}$ to the register 354.

Further, the input data control circuit 322 outputs the write flag data to the addition circuit 328a(c). The addition circuit 328a adds the write flag data to the results of calculation of the CRCC calculation circuit 326 and returns it to the input data control circuit 322. The input data control circuit 322 stores the results of calculation with the added write flag data in the memory circuit 330 (d).

The register circuit 336 reads out the results of the addition of the addition circuit 328a stored in the memory circuit 332 in synchronization with the network clock signal NCLK and outputs it in synchronization with the internal clock signal $4f_{sc}$.

The control circuits 338 and 378, like with the control circuits 204 and 216 (FIG. 7) of the transmitting apparatus 20, manage the write addresses and read addresses of the register circuits 334 and 336.

In the second block 350, the timing generating circuit e370 controls the timing of operation of the parts of the second block 350 based on the internal clock signal $4f_{sc}$.

The reference signal generating circuit 372 generates a reference signal (black burst signal $4f_{sc}$') synchronized with the internal clock signal $4f_{sc}$ (in the data transmission apparatus 3a, house clock signal $4f_{sc}$ input from the transmitting unit 50, while in the data transmission apparatus 3b, synchronization clock signal $4f_{sc}$ input from the clock generating apparatus 38) in accordance with the control of the timing generating circuit e370 and outputs it to the VTR's 14a and 14b.

The reference signal generating circuit 356 generates the reference signal and outputs it to the terminal a of the switch circuit 374.

Note that the reference signals generated by the reference signal generating circuits 372 and 356 do not include the video data and ancillary data and are signals which make the screen black (black burst signals) after reproduction.

The data output from the register circuit 334 is input to the register 354. On the other hand, the data output from the register circuit 336 is input to the output data control circuit 352.

The register circuit 354 divides the words of the data corresponding to the ancillary data portion shown in FIG. 3 (audio data multiplexed on ancillary region shown in FIG. 2) into the lower 2 bits and their parity bit (a) and the upper 8 bits (b) and their parity bit and outputs them to the input data control circuit 322.

The output data control circuit 352 outputs the data corresponding to the video data portion shown in FIG. 3 (video data multiplexed in video data region shown in FIG. 2) and the parity to the deshuffling circuit 358 (c), outputs the data corresponding to the ancillary data portion shown in FIG. 3 (audio data multiplexed in ancillary data region shown in FIG. 2) and its parity to the error correction circuit 362 (d), and outputs the data RS422-ch1, RS422-ch2, VOICE, RTS, and spare data shown in FIG. 2 to the error correction circuit 366 (e). That is, the output data control circuit 352 performs the role of a demultiplexing circuit for separating the audio data and video data and the data RS422-ch1 etc. from the PDU packet.

The output data control circuit 352, due to this processing, newly outputs the logical value "1" as the flag data when one of the data (2), (4), (5), or (6) of the as 8 bit data (1)+flag data (2), b; 2 bit (3)+flag data (4), output of register 2=CRCC 1bit+flag data (6) is the logical value "1".

That is, the output data control circuit 352 converts with a flag the two word width of a; (8 bits of received data+1 bit of flag data) to the (10 bits of ancillary data+1 bit of flag data).

The deshuffling circuit 358 performs processing corresponding to the shuffling circuit 190 shown in FIG. 7 based on the data LNID2 and LN2 included in the input data so as to restore the original order and outputs the result to the conceal circuit 360.

The conceal circuit 360 for example interpolates the data of the pixel where the data error occurs by the method of interpolation by the surrounding pixels etc. and outputs the result to the terminal b of the switch circuit 374.

The error correction circuit 362 corrects the error of the input audio data and outputs the result to the FIFO circuit 364.

The FIFO circuit 364 matches the timings between the video data output from the conceal circuit 360 and the error-corrected data output from the error correction circuit 362 and outputs the result to the terminal c of the switch circuit 374.

The switch circuit 374 selects one of the reference signal from the reference signal generating circuit 356, the output data of the conceal circuit 360, and the output signal of the FIFO circuit 364 input to the terminals a to c in the order of compliance with the D2 standard audio and video data in the SDI system and outputs the result to the P/S circuit 376.

The P/S circuit 376 converts the data input from the switch circuit 374 to a serial format data and outputs the result synchronized with the internal clock signal $4f_{sc}$.

The error correction circuit 366 corrects errors in the data RS422-ch1 and other data input and outputs the result to the switch circuit 368.

The switch circuit 368 separates the error-corrected data and outputs the results as the data RS422-ch1, RS422-ch2, VOICE, RTS, and spare data.

Next, an explanation will be made of the operation of the data transmission apparatuses 3a and 3b.

The RTS generating apparatus 16 of the transmitting unit 50 of the data transmission apparatus 3a generates the synchronization data RTS and successively outputs it to the transmitting apparatus 20.

On the other hand, the delay processing circuit 22 of the transmitting unit 50 of the data transmission apparatus 3a outputs the bits 8F1 and 8F2 (FIG. 2) to the transmitting apparatus 20.

The transmitting apparatus 20 of the data transmission apparatus 3a multiplexes the synchronization data RTS and bits 8F1 and 8F2 in the PDU packet and transmits the result through the ATM communications channel 2 to the data transmission apparatus 3b.

The receiving apparatus 30 of the receiving unit 60 of the data transmission apparatus 3b receives the PDU packet transmitted from the data transmission apparatus 3a, demultiplexes the synchronization data RTS and the bits 8F1 and 8F2 from the PDU packet, and outputs them to the clock control apparatus 36 of the receiving unit 60 and the delay processing circuit 22 of the transmitting unit 50. The delay processing circuit 22 outputs the bits 8F1 and 8F2 input from the receiving apparatus 30 of the receiving unit 60 back to the transmitting apparatus 20 of the transmitting unit 50.

The transmitting apparatus 20 of the transmitting unit 50 of the data transmission apparatus 3b multiplexes the bits 8F1 and 8F2 with the PDU packet and transmits the result through the ATM communications channel 2 to the data transmission apparatus 3a.

On the other hand, the receiving unit 60 of the data transmission apparatus 3b generates a synchronization clock signal $4f_{sc}$ synchronized with the house clock signal $4f_{sc}$ of the data transmission apparatus 3a to the receiving apparatus 30 of the receiving unit 60 based on the demultiplexed synchronization data RTS.

That is, the receiving apparatus 30 of the data transmission apparatus 3b outputs the synchronization data RTS demultiplexed from the transmitted PDU packet to the clock control apparatus 60 of the receiving unit 60. The clock control apparatus 36 generates a clock control signal CC based on the input synchronization data RTS so as to make the synchronization clock signal synchronized with the synchronization data RTS be output from the clock generating apparatus 38 of the receiving unit 60.

Accordingly, a synchronization clock signal $4f_{sc}$ synchronized with the synchronization data RTS is generated from the receiving unit 60 of the data transmission apparatus 3b.

The receiving apparatus 30 of the receiving unit 60 of the data transmission apparatus 3b generates the black burst signal $4f_{sc}$ ' synchronized with the synchronization clock signal $4f_{sc}$ based on the synchronization clock signal $4f_{sc}$ generated. The black burst signal $4f_{sc}$ ' is output to the VTR 14b so the operation of the VTR 14b is synchronized with the black burst signal $4f_{sc}$ '. That is, the operation of the VTR 14b becomes synchronized with the house clock signal $4f_{sc}$ of the data transmission apparatus 3a.

The delay processing circuit 22 of the transmitting unit 50 of the data transmission apparatus 3a uses the bits 8F1 and 8F2 returned from the data transmission apparatus 3b to measure the delay time received by the transmission data traveling back and forth between the data transmission apparatuses 3a and 3b from the ATM communications channel 2.

The transmitting unit 50 of the data transmission apparatus 3a further multiplexes the data LN2 and LNID2 (FIG. 2) generated based on the delay time measured by the delay processing circuit 22 of the transmitting unit 50 of the data transmission apparatus 3a onto the PDU packet and transmits the result through the ATM communications channel 2 to the data transmission apparatus 3b.

The receiving unit 60 of the data transmission apparatus 3b receives a PDU packet transmitted from the data transmission apparatus 3a and demultiplexes it into the data LN2 and LNID2 and the synchronization data RTS.

The VTR 14b of the data transmission apparatus 3b performs advance control based on the demultiplexed data LN2 and LNID2. That is, the VTR 14b reproduces the D2 standard audio and video data for example of a time earlier than the actual time by exactly the amount necessary for compensating for the transmission delay time of the data transmission apparatuses 3a, 3b and outputs the same to the transmitting unit 50 of the data transmission apparatus 3b.

The transmitting unit 50 of the data transmission apparatus 3b transmits the audio and video data input from the VTR 14b multiplexed with the PDU packet through the ATM communications channel 2 to the data transmission apparatus 3a.

The receiving unit 60 of the data transmission apparatus 3a receives the PDU packet transmitted from the data transmission apparatus 3b in synchronization with the internal clock signal $4f_{sc}$ (house clock signal $4f_{sc}$ generated by the transmitting unit 50 of the data transmission apparatus 3a), demultiplexes it into the audio and video data, and outputs the results to the VTR 14.

That is, the switch 40 of them aster side receiving unit 60 is made to select not the clock signal from the clock generating apparatus 38 generated by the clock control signal CC, but the internal clock signal $4f_{sc}$ (house clock signal $4f_{sc}$ generated from the transmitting unit 50). Accordingly, the receiving unit 60 of the data transmission apparatus 3a can receive the PDU packet transmitted from the data transmission apparatus 3b in synchronization with the internal clock signal $4f_{sc}$ and the VTR 14a can record the audio and video data input from the receiving unit 60 in synchronization with the internal clock signal $4f_{sc}$.

As explained above, according to the data transmission apparatuses 3a and 3b according to the present invention, the data transmission apparatus 3b can generate audio and video data in synchronization with the house clock signal $4f_{sc}$ of the data transmission apparatus 3a.

Further, it is possible to transmit the audio and video data generated by the data transmission apparatus 3b through the ATM communications channel 2 to the data transmission apparatus 3b and have the data transmission apparatus 3a receive the same using the house clock signal $4f_{sc}$ of the data transmission apparatus 3a free from jitter. Accordingly, there is no need for reproduction of the synchronization clock signal of the data transmission apparatus 3b in the data transmission apparatus 3a and possible to transmit high quality audio and video data free from the effects of Jitter generated in the reproduced synchronization clock signal.

Note that the circuit configurations etc. of the transmitting unit 50 and the receiving unit 60 shown in the above embodiments are illustrations and can be replaced with circuits able to achieve similar functions etc.

Figure 11:
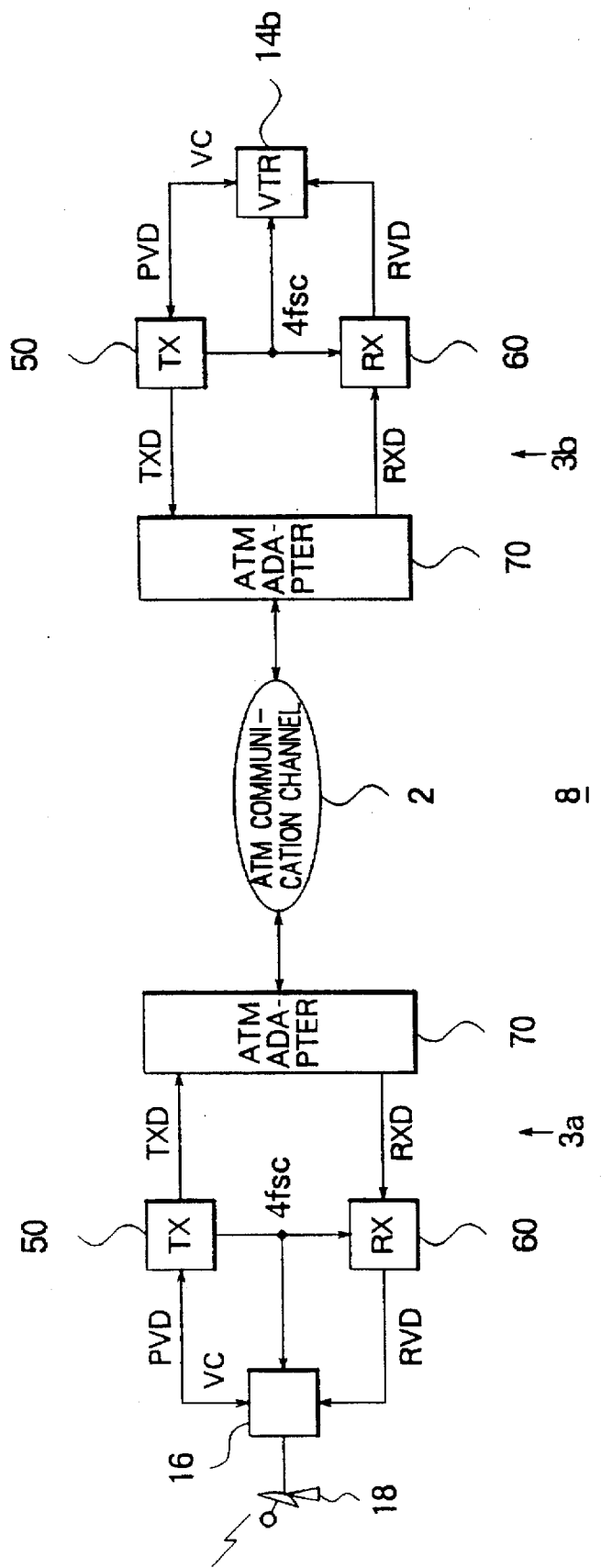
FIG. 11 is a view of a modification of the configuration of the data transmission apparatus shown in FIG. 1.

Further, while illustration was made of a VTR as the equipment to be connected to the transmitting unit 50 and the receiving unit 60, the invention is not limited to this. For example, as shown in FIG. 11, it is also possible to configure the invention to connect a relay apparatus 16 for inputting and outputting data by the SDI system or another transmission facility.

Further, the PDU package shown in FIG. 2 was an example. The present invention can be adopted to a transmission system using a transmission packet of another format.

Further, the data transmission system 1, transmitting unit 50, and receiving unit 60 of the present invention maybe used not only for audio and video data, but also for any one of these data or for data for information processing.

As explained above, according to the data transmission apparatus, system, and apparatus according to the present invention, it becomes possible to transmit high quality audio and video data between two nodes connected through a communications network supplying a network clock signal such as an ATM communications channel.

Further, according to the data transmission method, system, and apparatus according to the present invention, it is possible to receive at am aster side without any effect of jitter, in synchronization with a synchronization clock signal (house clock signal) generated independently at the master side, video and audio data generated in synchronization with a synchronization clock signal generated at a slave side node using synchronization data and the network clock signal of the communications channel and transmitted through the communications channel to the master side.

What is claimed is:

1. A data transmission method for transferring predetermined transmission data through a predetermined communications network between a slave side and a master side to which the predetermined transmission data is transmitted from the slave side, comprising:

generating at said master side an independent synchronization clock signal and transmitting synchronization data showing the frequency of the independent synchronization clock signal to the slave side;

generating at said slave side a slaved synchronization clock signal synchronized with the synchronization clock signal of the master side based on said synchronization data transmitted from the master side, generating said transmission data, and transmitting it to the master side in synchronization with the generated slaved synchronization clock signal; and receiving at said master side said transmission data transmitted from said slave side in synchronization with said independent synchronization clock signal.

2. The data transmission method as set forth in claim 1, wherein said predetermined communications network is a communications network operated in an asynchronous transmission mode.

3. A data transmission method for transferring predetermined transmission data through a predetermined communications network between a slave side and a master side to which a predetermined network clock signal is supplied and to which the predetermined transmission data is transmitted in synchronization with the network clock signal; comprising:

generating at said master side an independent synchronization clock signal independent of said network clock signal and transmitting synchronization data showing the ratio of the frequency of the network clock signal and the frequency of the independent synchronization clock signal by an approximate integer to the slave side;

generating at said slave side a slaved synchronization clock signal synchronized with the synchronization clock signal of the master side based on said synchronization data transmitted from the master side, generating said transmission data, and transmitting it to the master side in synchronization with the generated slaved synchronization clock signal; and receiving at said master side said transmission data transmitted from said slave side in synchronization with said independent synchronization clock signal.

4. The data transmission method as set forth in claim 3, wherein said predetermined communications network is a communications network operated in an asynchronous transmission mode.

5. A data transmission method for transferring transmission data between a master side and a slave side which are connected through a predetermined communications network so as to record data output from a recording and reproduction apparatus of the slave side in a recording and reproduction apparatus of the master side, comprising measuring a delay time of said predetermined communications network;

generating at said master side a synchronization clock signal and transmitting synchronization data shifting the phase of the synchronization clock signal by exactly said delay time along with other predetermined data as the transmission data to the slave side;

reproducing at said slave side data from the recording and reproduction apparatus of the slave side in synchronization with the synchronization data transmitted from the master side and transmitting it as the transmission data to the master side; and receiving at the master side the transmission data transmitted from the slave side in synchronization with the synchronization clock signal and recording it in the recording and reproduction apparatus of the master side.

6. The data transmission method as set forth in claim 5, wherein said predetermined communications network is a communications network operated in an asynchronous transmission mode.

7. The data transmission method as set forth in claim 5, wherein the delay time of the communications network is obtained by measuring the delay time using the transmission data traveling back and forth between the master side and the slave side.

8. The data transmission method as set forth in claim 5, wherein the data output from the recording and reproduction apparatus of the slave side and recorded in the recording and reproduction apparatus of the master side is comprised of video data and audio data.

9. A data transmission method for transferring transmission data between a master side and a slave side which are connected through a predetermined communications network so as to record data output from a recording and reproduction apparatus of the slave side in a recording and reproduction apparatus of the master side, comprising:

measuring a delay time of said predetermined communications network;

generating at said master side an independent synchronization clock signal and transmitting synchronization data shifting the phase of the independent synchronization clock signal by exactly said delay time as the transmission data to the slave side;

generating at said slave side a slaved synchronization clock signal synchronized with the independent synchronization clock signal of the master side based on the synchronization data transmitted from the master side, reproducing reproduction data from the recording and reproduction apparatus of the slave side in synchronization with the slaved synchronization clock signal generated, and transmitting it as the transmission data to the master side; and receiving at the master side the transmission data transmitted from the slave side in synchronization with the independent synchronization clock signal and recording it in the recording and reproduction apparatus of the master side.

10. The data transmission method as set forth in claim 9, wherein said predetermined communications network is a communications network operated in an asynchronous transmission mode.

11. The data transmission method as set forth in claim 9, wherein the data output from the recording and reproduction apparatus of the slave side and recorded in the recording and reproduction apparatus of the master side is comprised of video data and audio data.

12. A data transmission system for transferring transmission data through a predetermined communications network between a master apparatus and a slave apparatus, wherein said master apparatus has:

independent synchronization clock signal generating means for generating an independent synchronization clock signal, synchronization data generating means for generating synchronization data showing the frequency of the generated independent synchronization clock signal, master side transmitting means for transmitting at least the generated synchronization data through said communications network to the slave apparatus, and master side receiving means for receiving the transmission data transmitted from the slave apparatus through the communications network in synchronization with the generated independent synchronization clock signal, and said slave apparatus has:

slave side receiving means for receiving at least said synchronization data transmitted through said communications network from the master apparatus, slaved synchronization clock signal generating means for generating a slaved synchronization clock signal in synchronization with the independent synchronization clock signal of the master apparatus based on the received synchronization data, data generating means for generating the transmission data in synchronization with the generated slaved synchronization clock signal, and slave side transmitting means for transmitting at least the generated predetermined transmission data through the communications network to the master apparatus.

13. The data transmission system as set forth in claim 12, wherein said master apparatus has a data recording and reproducing means for recording and/or reproducing said transmission data received by said master side receiving means.

14. The data transmission system as set forth in claim 12, wherein said master apparatus further has a relaying and transmitting means for relaying and transmitting the transmission data received by said master side receiving means to another transmission apparatus.

15. The data transmission system as set forth in claim 12, wherein said predetermined communications network is a communications network of an asynchronous transmission mode.

16. A data transmission system for transmitting transmission data between a master apparatus and a slave apparatus connected through a predetermined communications network supplying a predetermined network clock signal to the connected apparatuses whereby the transmission data is transmitted in synchronization with the network clock signal, and wherein said master apparatus has:

independent synchronization clock signal generating means for generating an independent synchronization clock signal independent of said network clock signal, synchronization data generating means for generating synchronization data showing the whole integer ratio between the frequency of the independent synchronization clock signal and the frequency of the network clock signal, master side transmitting means for transmitting at least the generated synchronization data through the communications network to the slave apparatus, and master side receiving means for receiving the transmission data transmitted through the communications network from the slave apparatus in synchronization with the generated independent synchronization clock signal, and said slave apparatus has:

slave side receiving means for receiving at least the synchronization data transmitted through the communications network from the master apparatus, slaved synchronization clock signal generating means for generating a slaved synchronization clock signal synchronized with the independent synchronization clock signal of the master apparatus based on said received synchronization data, data generating means for generating said transmission data in synchronization with the generated slaved synchronization clock signal, and slave side transmitting means for transmitting at least the generated predetermined transmission data through the communications network to the master apparatus.

17. The data transmission system as set forth in claim 16, wherein said master apparatus has a data recording and reproducing means for recording and/or reproducing said transmission data received by said master side receiving means.

18. The data transmission system as set forth in claim 16, wherein said master apparatus further has a relaying and transmitting means for relaying and transmitting the transmission data received by said master side receiving means to another transmission apparatus.

19. The data transmission system as set forth in claim 16, wherein said predetermined communications network is a communications network of an asynchronous transmission mode.

20. A data transmission apparatus for transferring transmission data between transmission apparatuses which are connected through a predetermined communications network, having an independent synchronization clock signal generating means for generating an independent synchronization clock signal, a synchronization data generating means supplied with said independent synchronization clock signal and generating synchronization data showing the frequency of the independent synchronization clock signal, a transmitting means receiving as input at least the synchronization data from the synchronization data generating means and transmitting the synchronization data to the communications network, a receiving means for receiving transmission data transmitted through the communications network and including at least said synchronization data, a slaved synchronization clock signal generating means for generating from the synchronization data output from said receiving means a slaved synchronization clock signal synchronized with said independent synchronization clock signal, and a switching means for selecting said independent synchronization clock signal output from said independent synchronization clock signal generating means and outputting said independent synchronization clock signal to said transmitting means, said synchronization data generating means, said receiving means, and said slaved synchronization clock signal generating means when said data transmission apparatus operates as a master apparatus with respect to another data transmission apparatus connected through the communications network and for selecting said slaved synchronization clock signal output from said slaved synchronization clock signal generating means and outputting said independent synchronization clock signal to said receiving means, said transmitting means, and said synchronization data generating means when said data transmission apparatus operates as a slave apparatus with respect to another data transmission apparatus connected through the communications network.

21. A data transmission apparatus as set forth in claim 20, further having a data recording and reproducing means for recording and/or reproducing transmission data received by said receiving means, said data recording and reproducing means recording and/or reproducing said transmitting apparatus on a predetermined recording medium in synchronization with said independent synchronization clock signal output from said switching means when said data transmission apparatus operates as a master apparatus with respect to another data transmission apparatus connected through the communications network and recording and/or reproducing said transmission data on a predetermined recording medium in synchronization with said slaved synchronization clock signal output from said switching means.

22. A data transmission apparatus as set forth in claim 20, wherein said predetermined communications network is a communications network of an asynchronous transmission mode.

23. A data transmission apparatus as set forth in claim 20, wherein said data transmission apparatus further has a delay measuring means connected between said transmitting means and said receiving means for measuring the round trip delay time of said transmission data transmitted through said predetermined communications network and outputting to the receiving means delay data showing to shift the phase of the independent synchronization clock signal by exactly the delay time, said receiving means fetches the delay time measurement data from the received transmission data and outputs it to the delay measuring means, and said transmitting means receives as input said delay data and multiplexes with the transmission data data showing the frequency of the independent synchronization clock signal shifting the phase of the independent synchronization clock signal by exactly the delay time and transmits it to the communications network.

24. A data transmission apparatus to which a network clock signal is supplied for transferring transmission data in synchronization with said network clock signal through a predetermined communications network, having an independent synchronization clock signal generating means for generating an independent synchronization clock signal independent from said network clock signal, a synchronization data generating means for generating synchronization data showing by a whole ratio the ratio of the frequency of the independent synchronization clock signal generated from the independent synchronization clock signal output from the independent synchronization clock signal generating means and the frequency of the network clock signal, a transmitting means for transmitting at least the synchronization data generated by said synchronization data generating means to the communications network, a receiving means for receiving at least the transmission data transmitted through the communications network and including the synchronization data, a slaved synchronization clock signal generating means for generating a slaved synchronization clock signal synchronized with the independent synchronization clock signal from the synchronization data output from the receiving means, and a switching means for selecting said independent synchronization clock signal output from said independent synchronization clock signal generating means and outputting said independent synchronization clock signal to said transmitting means, said synchronization data generating means, said receiving means, and said slaved synchronization clock signal generating means when said data transmission apparatus operates as a master apparatus with respect to another data transmission apparatus connected through the communications network and for selecting said slaved synchronization clock signal output from said slaved synchronization clock signal generating means and outputting said independent synchronization clock signal to said receiving means, said transmitting means, and said synchronization data generating means when said data transmission apparatus operates as a slave apparatus with respect to another data transmission apparatus connected through the communications network.

25. A data transmission apparatus as set forth in claim 24, wherein said data transmission apparatus further has a data recording and reproducing means for recording and/or reproducing transmission data received by said receiving means, said data recording and reproducing means recording and/or reproducing said transmitting apparatus on a predetermined recording medium in synchronization with said independent synchronization clock signal output from said switching means when said data transmission apparatus operates as a master apparatus with respect to another data transmission apparatus connected through the communications network and recording and/or reproducing said transmission data on a predetermined recording medium in synchronization with said slaved synchronization clock signal output from said switching means.

26. A data transmission apparatus as set forth in claim 24, wherein said predetermined communications network is a communications network of an asynchronous transmission mode.

27. A data transmission apparatus as set forth in claim 24, wherein said data transmission apparatus further has a delay measuring means connected between said transmitting means and said receiving means for measuring the round trip delay time of said transmission data transmitted through said predetermined communications network and outputting to the receiving means delay data showing to shift the phase of the independent synchronization clock signal by exactly the delay time, said receiving means fetches the delay time measurement data from the received transmission data and outputs it to the delay measuring means, and said transmitting means receives as input said delay data and multiplexes with the transmission data data showing the frequency of the independent synchronization clock signal shifting the phase of the independent synchronization clock signal by exactly the delay time and transmits it to the communications network.

* * * * *